US009457517B2

(12) United States Patent
Cheng et al.

(10) Patent No.: US 9,457,517 B2
(45) Date of Patent: Oct. 4, 2016

(54) POWDER SHAPING METHOD AND APPARATUS THEREOF

(71) Applicant: INDUSTRIAL TECHNOLOGY RESEARCH INSTITUTE, Hsin-Chu (TW)

(72) Inventors: Chung-Wei Cheng, Miaoli County (TW); Kuang-Po Chang, Taichung (TW); Cen-Ying Lin, Kaohsiung (TW); Shu-Yi Wang, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 357 days.

(21) Appl. No.: 14/136,555

(22) Filed: Dec. 20, 2013

(65) Prior Publication Data
US 2015/0130118 A1    May 14, 2015

(30) Foreign Application Priority Data

Nov. 8, 2013    (TW) .............................. 102140774 A

(51) Int. Cl.
*B29C 67/00* (2006.01)
*B22F 3/105* (2006.01)
*B22F 3/10* (2006.01)

(52) U.S. Cl.
CPC ......... *B29C 67/0077* (2013.01); *B22F 3/1055* (2013.01); *B22F 3/1017* (2013.01); *B22F 2003/1056* (2013.01); *Y02P 10/295* (2015.11)

(58) Field of Classification Search
CPC ...................... B29C 67/0077; B29C 67/0085
USPC ........................ 425/174.4; 264/482, 485, 497
See application file for complete search history.

(56) References Cited

U.S. PATENT DOCUMENTS

| 5,393,482 A | 2/1995 | Benda et al. |
| 5,508,489 A | 4/1996 | Benda et al. |
| 6,007,764 A | 12/1999 | Benda et al. |

(Continued)

FOREIGN PATENT DOCUMENTS

| CN | 101670433 | 3/2010 |
| CN | 101932429 | 12/2010 |

(Continued)

OTHER PUBLICATIONS

Taiwan Patent Office, "Office Action," Oct. 14, 2015.

(Continued)

*Primary Examiner* — Timothy Kennedy
(74) *Attorney, Agent, or Firm* — WPAT, PC; Justin King; Jonathan Chiang

(57) ABSTRACT

A powder shaping method comprises: providing a powder on a target surface; providing a laser beam to illuminate the powder so as to form a pre-treated powder; and providing an energy beam to illuminate the pre-treated powder for enabling a shaping process. In addition, a powder shaping apparatus comprises a base, a target surface, a powder supply unit and an energy beam source system. The target surface is disposed on the base and can be fixed or moved on the base. The powder supply unit provides a powder on the target surface. The energy beam source system has a laser source and an energy source, the laser source provides a laser beam to illuminate the powder to form a pre-treated powder, and the energy source provides an energy beam to further illuminate the pre-treated powder to make a shaping process.

30 Claims, 7 Drawing Sheets

(56) References Cited

U.S. PATENT DOCUMENTS

| | | |
|---|---|---|
| 6,217,816 B1 | 4/2001 | Tang |
| 6,809,291 B1 | 10/2004 | Neil et al. |
| 7,491,909 B2 | 2/2009 | Yamamoto et al. |
| 7,718,351 B2 | 5/2010 | Ying et al. |
| 8,139,148 B2 | 3/2012 | Okita |
| 2007/0108644 A1 | 5/2007 | Cregger |
| 2012/0217226 A1* | 8/2012 | Bayer .................. B22F 3/1055 219/76.16 |
| 2012/0237745 A1 | 9/2012 | Dierkes et al. |
| 2012/0282134 A1 | 11/2012 | Liu et al. |

FOREIGN PATENT DOCUMENTS

| | | |
|---|---|---|
| EP | 0724494 A1 | 8/1996 |
| EP | 0724494 B1 | 6/1998 |
| EP | 2106337 | 10/2009 |
| EP | 2292357 A1 | 3/2011 |
| EP | 2295189 A1 | 3/2011 |
| EP | 2464477 A1 | 6/2012 |
| EP | 2295189 B1 | 7/2013 |
| TW | 200540010 | 12/2005 |
| TW | 200824727 | 6/2008 |
| WO | 2013127655 | 9/2013 |

OTHER PUBLICATIONS

"Micro/Nano machining with femtosecond laser pulses," Jun. 2010, Physics Bimonthly, 32 vol. 3, pp. 208-212.

Ren YP, Chen JK, Zhang YW. Optical properties and thermal response of copper films induced by ultrashort-pulsed lasers. Journal of Applied Physics. 2011;110.

Theberge F, Chin SL. Enhanced ablation of silica by the superposition of femtosecond and nanosecond laser pulses. Applied Physics a-Materials Science & Processing. 2005;80:1505-10.

Yahng JS, Chon BH, Kim CH, Jeoung SC, Kim HR. Nonlinear enhancement of femtosecond laser ablation efficiency by hybridization with nanosecond laser. Optics Express. 2006;14:9544-50.

Kamada H, Hiratani Y, Toyoda K. Cluster ion control by simultaneous irradiations of femtosecond laser and nanosecond laser pulses. Applied Surface Science. 2002;197:656-60.

Kim DS, Ahn YJ, Lee WH, Bae SW, Choi KH. A study of the solid freeform fabrication (SFF) system with dual laser system. Jsme International Journal Series C-Mechanical Systems Machine Elements and Manufacturing. 2006;49:1215-22.

Kim HC, Choi KH, Doh YH, Kim DS. Fabrication of parts and their evaluation using a dual laser in the solid freeform fabrication system. Journal of Materials Processing Technology. 2009;209:4857-66.

Shi Y, Chen S, Lu X, Huang S. Study on self-heating metallic powder for the selective laser sintering process. Proceedings of the Institution of Mechanical Engineers Part B—Journal of Engineering Manufacture. 2004;218:1239-47.

Ren YP, Chen JK, Zhang YW, Huang J. Ultrashort laser pulse energy deposition in metal films with phase changes. Applied Physics Letters. 2011;98.

European Patent Office, "Extended European Search Report", Mar. 19, 2015.

* cited by examiner

POWDER SHAPING METHOD AND APPARATUS THEREOF

CROSS REFERENCE TO RELATED APPLICATION

This application also claims priority to Taiwan Patent Application No. 102140774 filed in the Taiwan Patent Office on Nov. 8, 2013, the entire content of which is incorporated herein by reference.

TECHNICAL FIELD

The present disclosure relates to a powder shaping technology, and more particularly, to a powder shaping method and apparatus by laser.

BACKGROUND

Additive manufacturing is a revolutionary technology, that is distinct from traditional subtractive machining techniques, which rely on the removal of material by methods such as cutting or drilling, and generally includes the techniques of rapid prototyping (RP) and rapid manufacturing (RM).

Generally, a recent additive manufacturing process involves the use of a high power laser, such as selective lase sintering/melting (SLS/SLM), using which a laser beam is used for selectively fuses powdered material by scanning cross-sections generated from a 3-D digital description of a part on the surface of a powder bed, and after each cross-section is scanned, the powder bed is lowered by one layer thickness for allowing a new layer of material to be applied on top and then enabling the process to repeat until the 3D part is completed. Comparing to conventional machining processes, the SLS/SLM technology is in wide use around the world due to its ability to easily make very complex geometries directly from digital CAD data, such as parts with complex internal flow passages and internal structures.

Please refer to FIG. 1, which is a schematic view of a conventional additive manufacturing process. As shown in FIG. 1, a conventional additive manufacturing process is performed by projecting a laser beam 1 emitted either from a continuous wave (CW) laser source or a long pulse laser source on a powder 2 so as to melt or sinter the powder 2. However, since the surface reflective index of the powder 2 can be higher than 90%, the laser beam 1 is generally being scattered outside the designed scan area 3, causing poor molding accuracy due to severe heat diffusion.

SUMMARY

The present disclosure provides a powder shaping method designed for enhancing the absorptivity of a powder for preventing the scattering of a laser beam and thus improving molding accuracy.

The present disclosure provides a powder shaping method, in which as soon as a first beam of laser from an ultra-fast laser source is projected upon the surface of a powder bed, the internal temperature of the powder is raised instantly for enabling the collision rate between electron and phonon to increase so as to cause the reflectivity of the powder to drop, while simultaneously inducing a periodic surface micro- and nano-structure on the same. Thereby, the absorptivity of the powder that is to be sintered can be raised by 5 to 10 times, and the power of the second leaser beam can be lowered while still sufficient to be used for sintering the powder since it had already been pre-treated. Moreover, the scattering of the laser beam that is projected on the powder bed is reduced, so that the powder outside the designed scan area is prevented from being sintered and molded, resulting that the molding accuracy of the additive manufacturing process is increased.

The present disclosure provides a powder shaping method, capable of using an ultra-fast laser and a long pulse laser to form an additive layered structure with satisfactory molding accuracy.

In an exemplary embodiment, the present disclosure provides a powder shaping method, comprising the steps of: providing a powder on a target surface; providing a laser beam to illuminate the powder so as to form a pre-treated powder; and providing an energy beam to illuminate the pre-treated powder for enabling a shaping process. The target is a plate, a platform, a stage, a work piece, or a powder bed.

In another exemplary embodiment, the present disclosure provides a powder shaping apparatus, comprising: a base, a target, a powder supply unit and an energy beam source system. The target is disposed on the base and can be fixed or moved on the base. The powder supply unit provides a powder on the target surface. The energy beam source system has a laser source and an energy source, the laser source provides a laser beam to illuminate the powder to form a pre-treated powder, and the energy source provides an energy beam to illuminate the pre-treated powder for enabling a shaping process.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
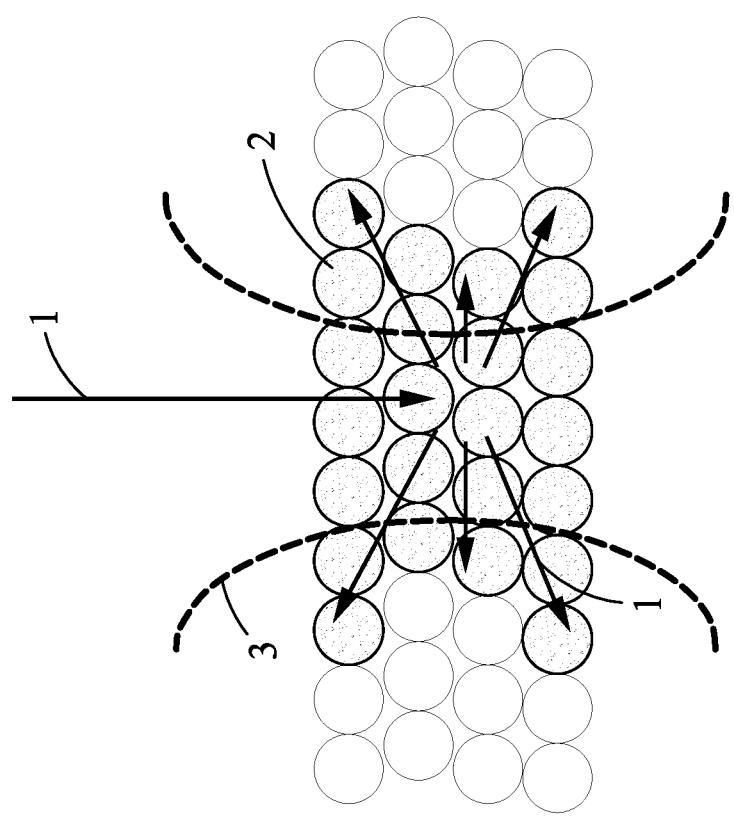
FIG. 1 is a schematic view of a conventional additive manufacturing process.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
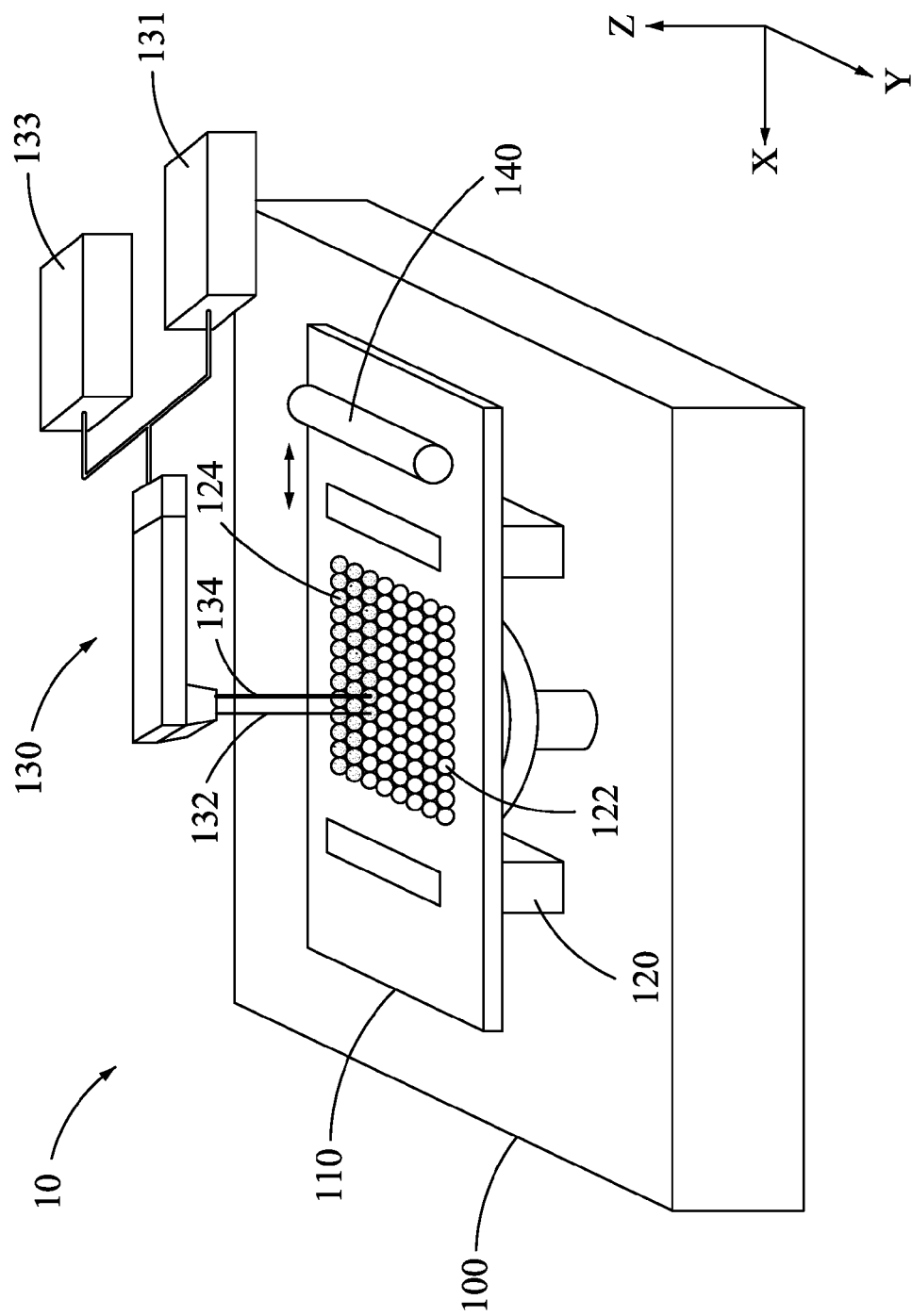
FIG. 2 is a schematic view of a powder shaping apparatus according to an embodiment of the present disclosure.

Please refer to FIG. 2, which is a schematic view of a powder shaping apparatus according to an embodiment of the present disclosure. As shown in FIG. 2, a powder shaping apparatus 10 comprises: a base 100, a target 110, a powder supply unit 120 and an energy beam source system 130, in which the target 110 is disposed on the base 100. The target is a plate, a platform, a stage, a work piece, or a powder bed.

Figure 3:
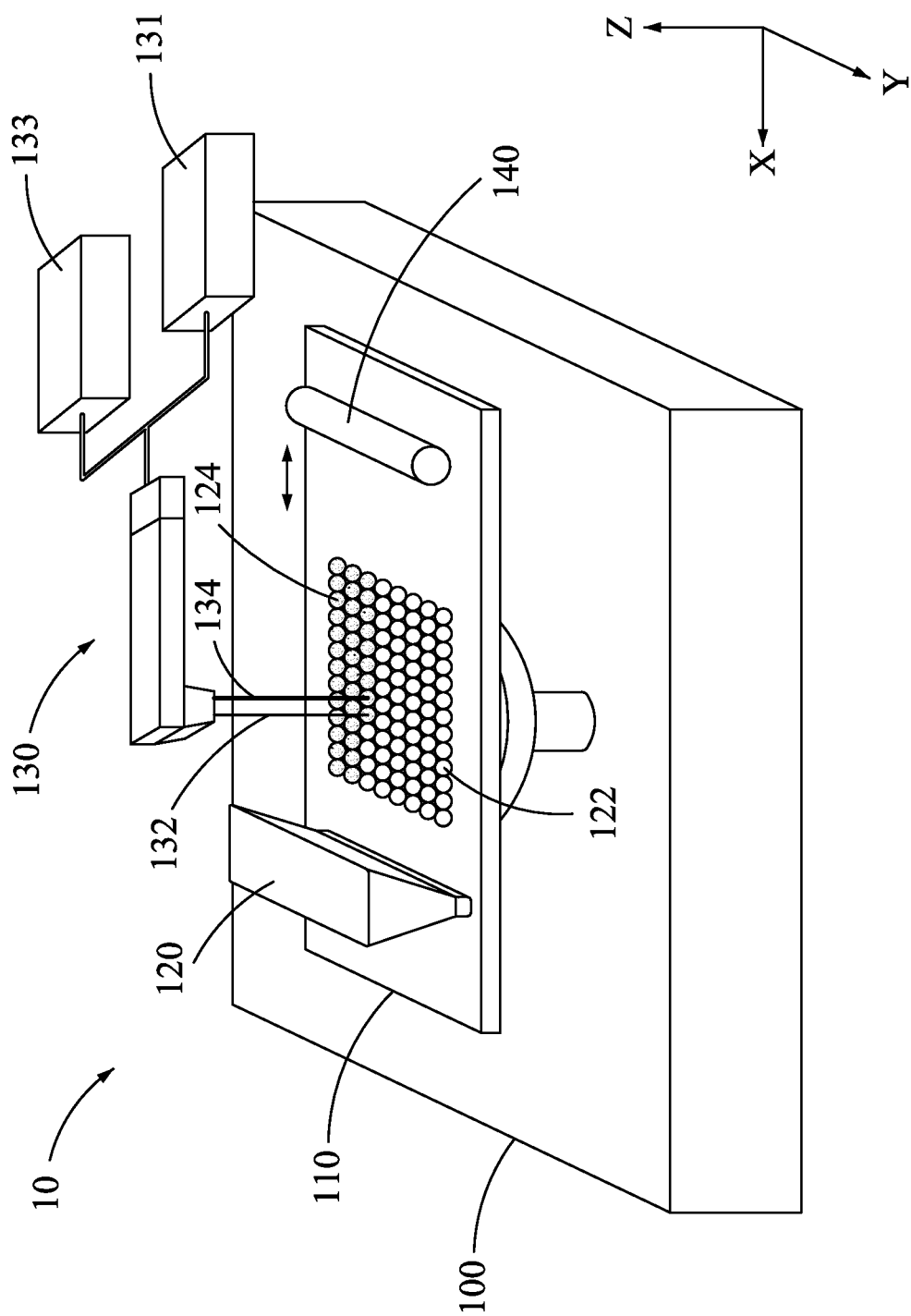
FIG. 3 is a schematic view of a powder shaping apparatus according to another embodiment of the present disclosure.

The target 110 may be fixed on the base 100 or be moved on the base 100. In this embodiment, the target 110 that is mounted on the base 100 is enabled to perform a three-dimensional movement defined in a Cartesian coordinate system of XYZ-axes. In addition, the powder supply unit 120 is disposed beneath the target 110 and is used for providing a powder 122 on the surface of the target 110. Nevertheless, in another embodiment shown in FIG. 3, the powder supply unit 120 can be disposed at a position above the target 110 and also is being used for providing the powder 122 on the surface of the target 110. It is noted that the positioning of the powder supply unit 120 is not limited by the aforesaid embodiments. Moreover, the energy beam source system 130 further comprises: a laser source 131 and an energy source 133, in which the laser source 131 is used for providing and projecting a laser beam 132 to the powder 122 for forming a pre-treated powder 124, and the energy source 133 is used for providing and projecting an energy beam to the pre-treated powder 124 so as to enable a shaping process. In this embodiment, the shaping process can be a sintering process or a melting process.

In an embodiment of the present disclosure, the powder shaping apparatus 10 further comprises: a powder flattening unit 140, which is used for flattening the powder 122 deposit on the surface of the target 110 by the powder supply unit 120. In this embodiment, the powder flattening unit 140 is substantially a roller, and it is noted that the powder flattening unit 140 can be a device selected from the group consisting of: a roller and a scraper, but is not limited thereby.

Moreover, the laser source 131 in the present embodiment is an ultra-fast laser source, such as a femtosecond laser source or a picosecond laser source, whereas the threshold fluence of the laser beam working on the powder is smaller than 6 $J/cm^2$; the wavelength of the ultra-fast laser source is ranged between 250 nm and 3000 nm; the pulse width of the ultra-fast laser source is smaller than 1 ns; and the ultra-fast laser source has a repetition rate ranged between 1 Hz and 1 GHz. Operationally, when the surface of the powder 122 is projected by the laser beam 132 from the ultra-fast laser source, the internal temperature of the electron inside the powder 122 is raised instantly for enabling the collision rate between electron and phonon to increase so as to cause the reflectivity of the powder 122 to drop, while simultaneously inducing a periodic surface micro- and nano-structure on the surface of the powder 122, and thereby, enabling the absorptivity of the powder that is to be sintered to be raised by five to ten times. In the present embodiment, the energy source 133 is a source selected from the group consisting of: a continuous wave laser source, a long-pulse laser source, an electron beam source, and a plasma source, whereas the energy of the energy beam from the energy source 133 working on the powder is larger than 200 W. The energy of the energy beam used in the present embodiment is 200 W, but is not limited thereby. It is noted that when the powder 122 illuminated by the laser beam 132 and thus transformed into the pre-treated powder 124 so as to be ready for sintering by the energy beam 134, the power of the energy beam 134 can be lowered while still sufficient to be used for sintering the pre-treated powder 124 since it had already been pre-treated. Moreover, the scattering of the energy beam that is projected on the pre-treated powder 124 is reduced, so that the powder outside the designed scan area is prevented from being sintered and molded, resulting that the molding accuracy of the additive manufacturing process is increased.

Figure 4:
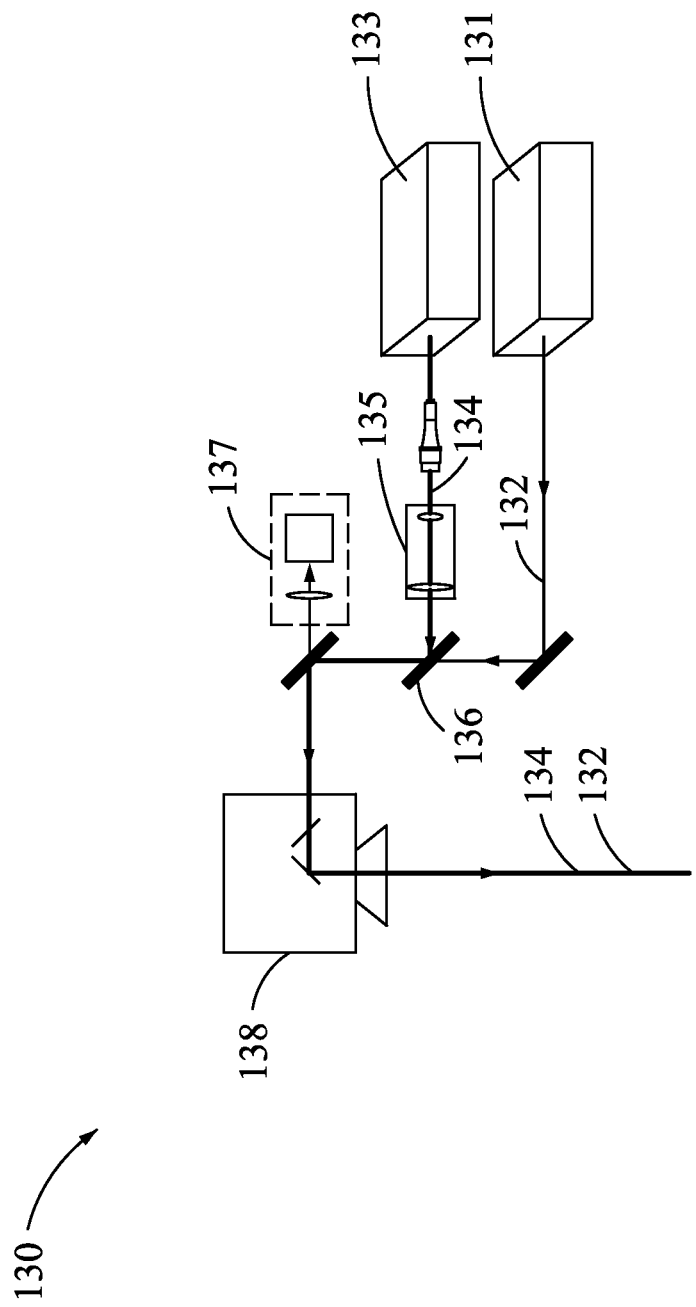
FIG. 4 is a schematic view of an energy beam source system with collinear optical path used in an embodiment of the present disclosure.
Figure 5:
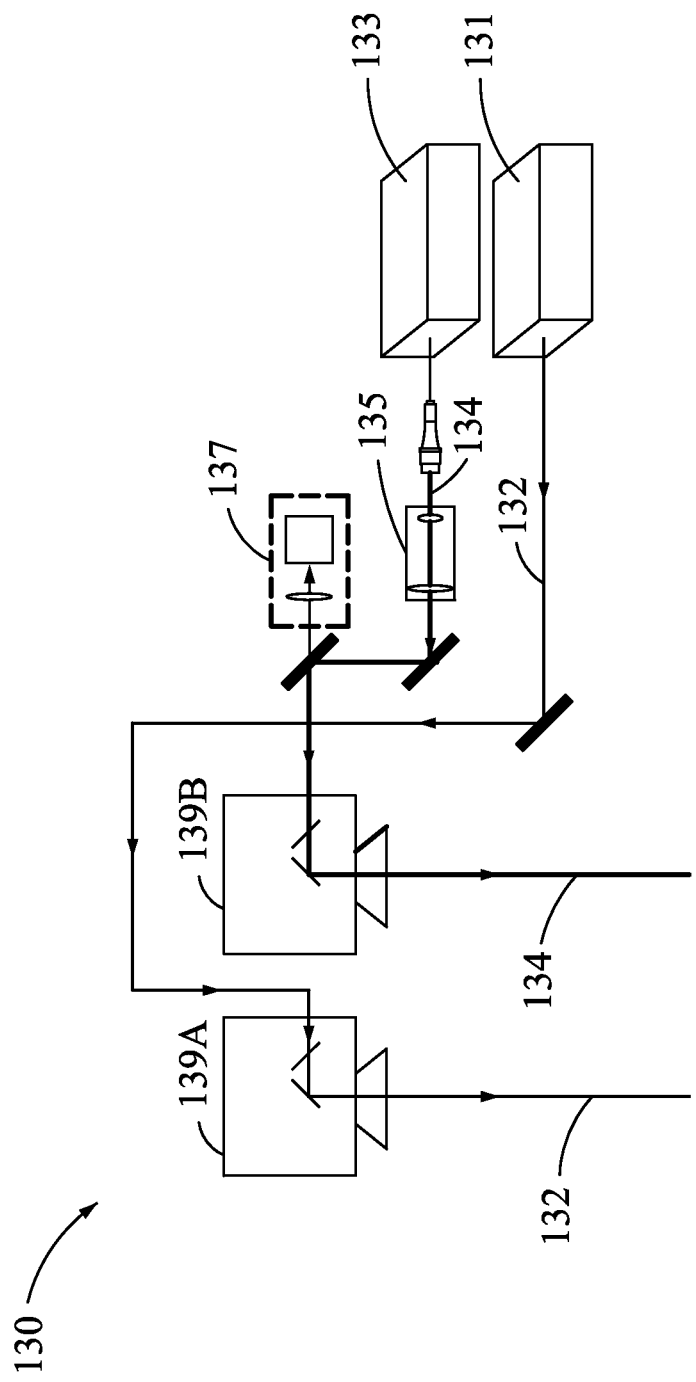
FIG. 5 is a schematic view of an energy beam source system with separate optical paths used in an embodiment of the present disclosure.

Please refer to FIG. 4, which is a schematic view of an energy beam source system with collinear optical path used in an embodiment of the present disclosure. The energy beam source system may comprise a beam expander, a beam splitter, a machine vision system and a scanner system. The machine vision system may be coaxial or non-coaxial, the embodiment in FIG. 4 and FIG. 5 is showed a coaxial vision. The scanner system may have at least one scan head. The energy beam system may perform a collinear optical path by using a scan head, and shown in FIG. 4. It may further perform a separate optical paths by using two scan heads, and shown in FIG. 5. In the embodiment shown in FIG. 4, the energy beam source system 130 comprises: a beam expander 135, a beam splitter 136, a coaxial vision 137 and a first scan head 138, in which the beam splitter 136 is used for performing a collinear optical path process upon the laser beam 132 and the energy beam 134 before the first scan head 138 is enabled to project the laser beam 132 onto the powder 122 and then to project the energy beam 134 onto the pre-treated powder 124 so as to complete the shaping process.

Please refer to FIG. 5, which is a schematic view of an energy beam source system with separate optical paths used in an embodiment of the present disclosure. In the embodiment shown in FIG. 5, the energy beam source system 130 further comprises: a beam expander 135, a beam splitter 136, a coaxial vision 137, a second scan head 139A and a third scan head 139B, in which the laser beam 132 and the energy beam 134 are two projected in two optical paths that are independent to each other; and first the second scan head 139A is enabled to project the laser beam 132 onto the powder 122 for enabling the internal temperature of the electron inside the powder 122 to be raised instantly for enabling the collision rate between electron and phonon to increase so as to cause the reflectivity of the powder 122 to drop, while simultaneously inducing a periodic surface micro- and nano-structure on the surface of the powder 122, and thereby, enabling the absorptivity of the powder that is to be sintered to be raised by five to ten times, and thereafter the third scan head 139B is enabled to project the energy beam 134 onto the pre-treated powder 124 for enabling the shaping process. It is noted that when the powder 122 illuminated by the laser beam 132 and thus transformed into the pre-treated powder 124 so as to be ready for sintering by the energy beam 134, the power of the energy beam 134 can be lowered while still sufficient to be used for sintering the pre-treated powder 124 since it had already been pre-treated. Moreover, the scattering of the energy beam that is projected on the pre-treated powder 124 is reduced, so that the powder outside the designed scan area is prevented from being sintered and molded, resulting that the molding accuracy of the additive manufacturing process is increased.

Figure 6:
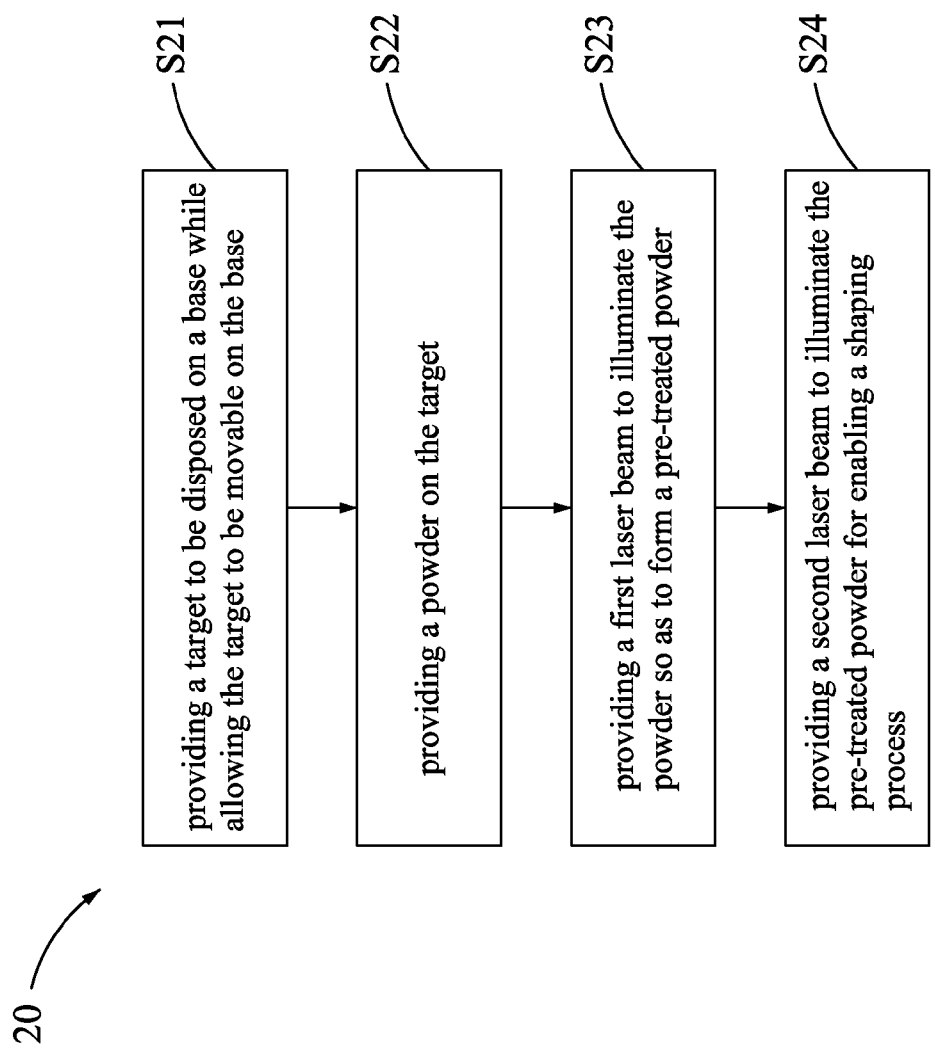
FIG. 6 is a flow chart depicting the steps performed in a powder shaping method according to an embodiment of the present disclosure.
Figure 7:
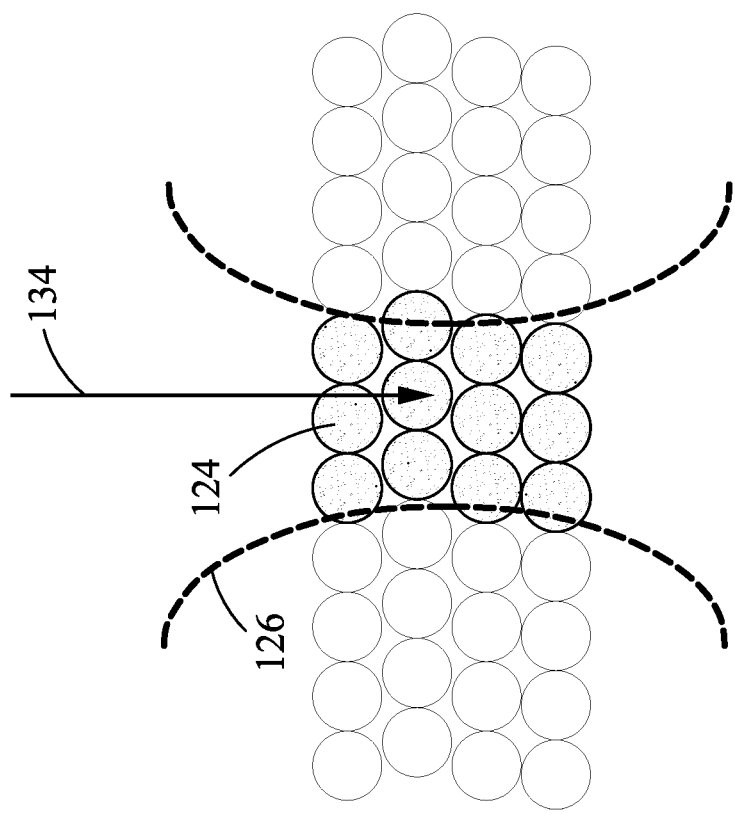
FIG. 7 is a schematic diagram showing a pre-treated powder achieved in an embodiment of the present disclosure.

Please refer to FIG. 6, which is a flow chart depicting the steps performed in a powder shaping method according to an embodiment of the present disclosure. The powder shaping method 20 of the present disclosure starts from the step S21. At the step S21, a target 110 is provided and disposed on a base 100 while allowing the target 110 to move on the base 100 in at least one-dimensional direction; and then the flow proceeds to step S22. In this embodiment, the target 110 that is mounted on the base 100 is enabled to perform a three-dimensional movement defined in a Cartesian coordinate system of XYZ-axes, but is not limited thereby. At the step S22, a powder 122 is provided on the surface of the target 110; and then the flow proceeds to step S23. At the step S23, a laser beam is provided to illuminate the powder 122 so as to form a pre-treated powder 124; and then the flow proceeds to step S24. At the step S24, an energy beam 134 is provided to illuminate the pre-treated powder 124 for enabling a shaping process. By the repeating of the step S21 to the step S24, a laser additive manufacturing process is completed. In addition, the energy beam source system 130 has a laser source 131 and an energy source 133, in that the laser source 131 is provided for providing and projecting a laser beam 132 onto the powder 122 for forming a pre-treated powder 124. By the illumination of the laser beam 132, there will be a micro- and nano-structure being induced to generate on the surface of the pre-treated powder 124, and thereby, not only the absorptivity of the pre-treated powder 124 can be raised, but also the reflectivity of the pre-treated powder 124 is reduced. Thereafter, the pre-treated powder 124 is ready to be illuminated by an energy beam 134 emitted from the energy source 133 for enabling a shaping process. Please refer to FIG. 7, which is a schematic diagram showing a pre-treated powder achieved in an embodiment of the present disclosure. As shown in FIG. 7, since the powder 122 had already been treated by the laser beam 132, the scattering of the energy beam 134 that is projected on the pre-treated powder 124 is reduced, so that the powder outside the designed scan area 126 is prevented from being sintered and molded, resulting that the undesired thermal dispersion effect is reduced and thus the molding accuracy of the additive manufacturing process is increased. In this embodiment, the shaping process can be a sintering process or a melting process.

In another embodiment, the powder shaping method 20 further comprises a step of: providing a powder flattening unit 140 to be used for flattening the powder 122 deposit on the target 110 by the powder supply unit 120. It is noted that the powder flattening unit 140 can be a roller or a scraper. In the present embodiment, the powder flattening unit 140 is a roller, but is not limited thereby.

Notably, after a powder is treated by a laser beam from an ultra-fast laser source, the surfaced of the powder is induced to generate a micro- and nano-structure, and thereby, the absorptivity of the powder is increased. Moreover, by the projection of the ultra-fast laser, the internal temperature of the powder is raised instantly for enabling the collision rate between electron and phonon to increase so as to cause the reflectivity of the powder to drop. For the physics of the above description, please refer to "Ultrashort laser pulse energy deposition in deposition in metal film with phase changes", by Yunpeng Ren, APPLED PHYSICS LETTERS 98, 191105 (2011).

To sum up, the present disclosure provides a powder shaping method and apparatus, using which a powder is pretreated by an ultra-fast laser for inducing a micro- and nano-structure to generate on the surface of the powder, while simultaneously enabling the internal temperature of the electron inside the powder to be raised instantly for enabling the collision rate between electron and phonon to increase so as to cause the reflectivity of the powder to drop, and thereby, enabling the absorptivity of the powder that is to be sintered to be raised. Consequently, another type of laser of lower power, such as continuous wave laser or long-pulse laser, can be used for sintering the pre-treated powder since it had already been pre-treated. Moreover, the scattering of the energy beam that is projected on the pre-treated powder is reduced, so that the powder outside the designed scan area is prevented from being sintered and molded, resulting that the molding accuracy of the additive manufacturing process is increased.

Comparing with conventional laser additive manufacturing, the present disclosure uses ultra-fast laser, so that the formation of surface micro- and nano-structure on the powder can be achieved comparatively faster. In addition, the absorptivity of the powder that is to be sintered is raised without having the powder to mix with another type of powder, so that the powder can be sintered by the use of another type of laser of lower power, such as continuous wave laser or long-pulse laser, while the molding accuracy of the additive manufacturing process is increased. Comparatively, since the sintering or melting of a conventional laser additive manufacturing is enabled using either continuous wave laser or long-pulse laser, the resulting molding accuracy may not be satisfactory as there can be severe light scattering effect.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A powder shaping method, comprises the following steps:
    providing a powder on a target surface;
    illuminating a laser beam to the powder to form a pre-treated powder;
    illuminating an energy beam to the pre-treated powder to perform a shaping process; and
    wherein the laser beam is from substantially an ultra-fast laser source and the threshold fluence of the laser beam working on the powder is smaller than 6 J/cm$^2$.

2. The powder shaping method of claim 1, further comprises a step of:
    providing an energy beam source system, while enabling the energy beam source system to comprise: a laser source, for providing the laser beam to illuminate the powder; and an energy source, for providing the energy beam to illuminate the pre-treated powder.

3. The powder shaping method of claim 1, wherein the shaping process is substantially a sintering process.

4. The powder shaping method of claim 1, wherein the shaping process is substantially a melting process.

5. The powder shaping method of claim 1, further comprises a step of:
    inducing the surfaced of the pre-treated powder to generate a micro- and nano-structure; or enabling the internal temperature of the electron inside the powder to be raised instantly for enabling the collision rate between electron and phonon to increase so as to cause the reflectivity of the powder to drop, and thereby, enabling the absorptivity of the powder that is to be sintered to be raised and also reducing the reflectivity of the pre-treated powder.

6. The powder shaping method of claim 2, wherein the energy source is a source selected from the group consisting of: a continuous wave laser source, a long-pulse laser source, an electron beam source, and a plasma source.

7. The powder shaping method of claim 2, wherein the energy beam source system further comprises: a beam expander, a beam splitter, a machine vision system and a first scan head.

8. The powder shaping method of claim 7, wherein the first scan head is enabled to illuminate the laser beam onto the powder and then to illuminate the energy beam onto the pre-treated powder.

9. The powder shaping method of claim 2, wherein the energy beam source system further comprises: a beam expander, a beam splitter, a machine vision system, a second scan head and a third scan head.

10. The powder shaping method of claim 9, wherein the second scan head is enabled to illuminate the laser beam onto the powder before the third scan head is enabled to illuminate the energy beam onto the pre-treated powder.

11. A powder shaping apparatus, comprising:
a base;
a target, disposed on the base; and
a powder supply unit, for providing a powder on the target surface; and
an energy beam source system, further comprising:
a laser source, for providing a laser beam to illuminate the powder to form a pre-treated powder; and
an energy source, for providing an energy beam to further illuminate the pre-treated powder to perform a shaping process;
wherein, the laser source is substantially an ultra-fast laser source and the threshold fluence of the laser beam working on the powder is smaller than 6 J/cm².

12. The powder shaping apparatus of claim 11, wherein the energy beam source system illuminates the pre-treated powder to perform a sintering process.

13. The powder shaping apparatus of claim 11, wherein the energy beam source system illuminates the pre-treated powder to perform a melting process.

14. The powder shaping apparatus of claim 11, wherein the condition of the target surface is selected from the group consisting of: fixed condition, continuous moving condition, and non-continuous moving condition.

15. The powder shaping apparatus of claim 11, wherein the wavelength of the ultra-fast laser source is ranged between 250 nm and 3000 nm.

16. The powder shaping apparatus of claim 11, wherein the pulse width of the ultra-fast laser source is smaller than 1 ns.

17. The powder shaping apparatus of claim 11, wherein the ultra-fast laser source has a repetition rate ranged between 1 Hz and 1 GHz.

18. The powder shaping apparatus of claim 11, wherein the energy source is a source selected from the group consisting of: a continuous wave laser source, a long-pulse laser source, an electron beam source, and a plasma source, which the power of the energy beam from the energy source working on the powder is larger than 200 W.

19. The powder shaping apparatus of claim 11, wherein the energy beam source system further comprises: a beam expander, a beam splitter, a machine vision system and a first scan head.

20. The powder shaping apparatus of claim 19, wherein the first scan head is enabled to project the laser beam onto the powder and then to project the energy beam onto the pre-treated powder.

21. The powder shaping apparatus of claim 11, wherein the energy beam source system further comprises: a beam expander, a beam splitter, a machine vision system, a second scan head and a third scan head.

22. The powder shaping apparatus of claim 21, wherein the second scan head is enabled to project the laser beam onto the powder before the third scan head is enabled to project the energy beam onto the pre-treated powder.

23. The powder shaping apparatus of claim 11, wherein the target is a plate, a platform, a stage, a work piece, or a powder bed.

24. A powder shaping method by employing a powder shaping apparatus which includes a base, a target disposed on the base, a powder supply unit for providing the powder on the target surface, and an energy beam source system that further comprises a laser source which provides a laser beam to illuminate the powder to form a pre-treated powder; and an energy beam to further illuminate the pre-treated powder; the powder shaping method comprises the following steps:
providing the powder on the target surface; and
illuminating the laser beam to the powder to form the pre-treated powder;
illuminating the energy beam to the pre-treated powder to perform the shaping process; and
wherein the laser source is substantially an ultra-fast laser source and the threshold fluence of the laser beam working on the powder is smaller than 6 J/cm2.

25. The powder shaping method of claim 24, further comprises a step of:
inducing the surfaced of the pre-treated powder to generate a micro- and nano-structure; or enabling the internal temperature of the electron inside the powder to be raised instantly for enabling the collision rate between electron and phonon to increase so as to cause the reflectivity of the powder to drop, and thereby, enabling the absorptivity of the powder that is to be sintered to be raised and also reducing the reflectivity of the pre-treated powder.

26. The powder shaping method of claim 24, wherein the energy source is a source selected from the group consisting of: a continuous wave laser source, a long-pulse laser source, an electron beam source, and a plasma source.

27. The powder shaping method of claim 24, wherein the energy beam source system further comprises: a beam expander, a beam splitter, a machine vision system and a first scan head.

28. The powder shaping method of claim 27, wherein the first scan head is enabled to illuminate the laser beam onto the powder and then to illuminate the energy beam onto the pre-treated powder.

29. The powder shaping method of claim 24, wherein the energy beam source system further comprises: a beam expander, a beam splitter, a machine vision system, a second scan head and a third scan head.

30. The powder shaping method of claim 29, wherein the second scan head is enabled to illuminate the laser beam onto the powder before the third scan head is enabled to illuminate the energy beam onto the pre-treated powder.

* * * * *